United States Patent [19]

Holmdahl

[11] Patent Number: 5,920,734
[45] Date of Patent: Jul. 6, 1999

[54] SYSTEM FOR PROVIDING ELECTRICAL POWER TO A COMPUTER INPUT DEVICE ACCORDING TO THE INTERFACE TYPES THROUGH THE SHARED USE OF WIRES AND A VOLTAGE CLAMP

[75] Inventor: Todd E. Holmdahl, Bothell, Wash.

[73] Assignee: Microsoft Corporation, Redmond, Wash.

[21] Appl. No.: 08/667,402

[22] Filed: Jun. 21, 1996

Related U.S. Application Data

[63] Continuation-in-part of application No. 08/595,345, Feb. 1, 1996, Pat. No. 5,754,890.

[51] Int. Cl.[6] ....................................................... G06F 1/26
[52] U.S. Cl. ........................... 395/893; 395/882; 395/884; 395/892; 361/601
[58] Field of Search ...................................... 361/686, 601; 326/77; 701/215; 345/157; 395/893, 882, 884, 892, 309; 178/19.01; 379/93.05; 323/313; 358/400

[56] References Cited

U.S. PATENT DOCUMENTS

| 4,886,941 | 12/1989 | Davis et al. | 178/19.01 |
|---|---|---|---|
| 5,212,774 | 5/1993 | Grider et al. | 395/309 |
| 5,331,509 | 7/1994 | Kikinis | 361/686 |
| 5,343,516 | 8/1994 | Callele et al. | 379/93.05 |
| 5,349,253 | 9/1994 | Ngo et al. | 326/77 |
| 5,436,552 | 7/1995 | Kajimoto | 323/313 |
| 5,499,108 | 3/1996 | Cotte et al. | 358/400 |
| 5,633,799 | 5/1997 | Dussell | 701/215 |
| 5,652,603 | 7/1997 | Abrams | 345/157 |

*Primary Examiner*—Thomas C. Lee
*Assistant Examiner*—David Ton
*Attorney, Agent, or Firm*—Seed and Berry LLP

[57] ABSTRACT

A system permits the shared use of lines in a cursor control device coupled to a PS/2 interface or a serial interface. A computer pointing device such as a mouse can be coupled to either the PS/2 interface or the serial interface. The current supplied by the serial interface is limited by conventional circuitry within the interface itself. However, a clock line, normally used when the pointing device is coupled to the PS/2 interface, can be used to supply additional current to the pointing device when coupled to a serial interface. A Schottky diode is coupled in series between a $V_{cc}$/RTS line and a power supply node within the pointing device. A second Schottky diode is coupled from a CLK/DTR line to the power supply node. When the pointing device is coupled to the PS/2 interface, the first Schottky diode provides current from a $V_{cc}$ source within the PS/2 interface. The second Schottky diode is not active when the pointing device is coupled to the PS/2 interface. When the pointing device is coupled to the serial interface, both the first and second Schottky diodes are active and both supply current to the power supply node. The first Schottky diode also prevents reverse current flow during initialization of the serial interface.

16 Claims, 7 Drawing Sheets

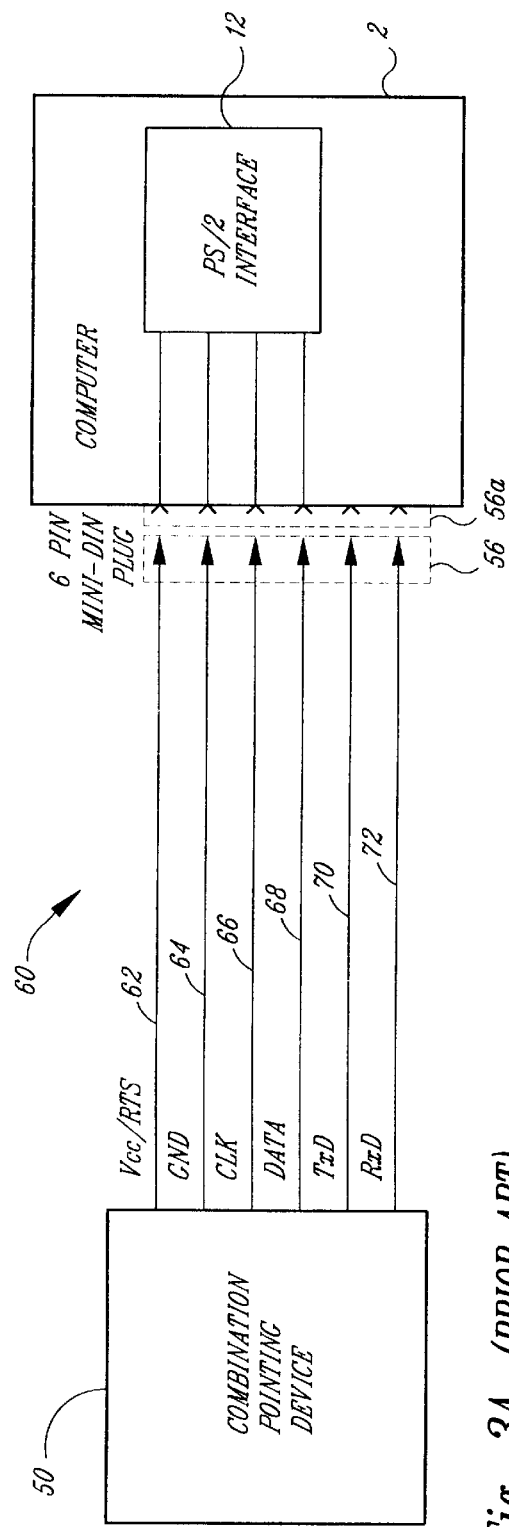
Fig. 3A *(PRIOR ART)*
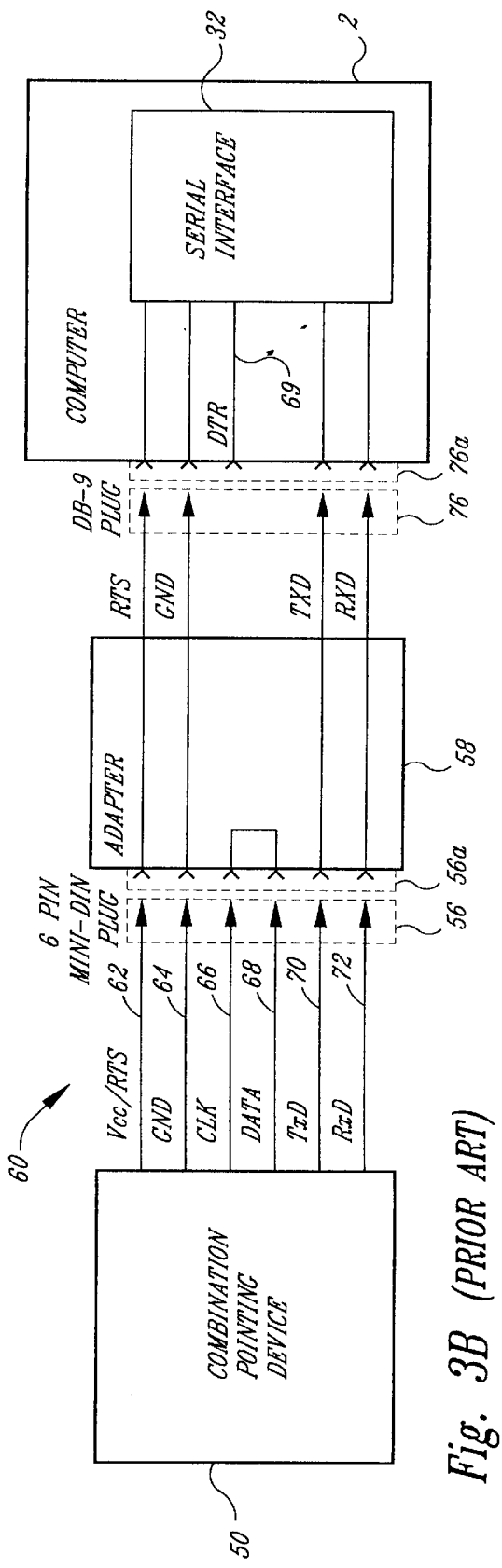
Fig. 3B *(PRIOR ART)*

5,920,734

SYSTEM FOR PROVIDING ELECTRICAL POWER TO A COMPUTER INPUT DEVICE ACCORDING TO THE INTERFACE TYPES THROUGH THE SHARED USE OF WIRES AND A VOLTAGE CLAMP

CROSS-REFERENCE TO RELATED APPLICATION

This application is a continuation-in-part of U.S. Pat. application Ser. No. 08/595,345, filed Feb. 1, 1996, now U.S. Pat. No. 5,754,890.

TECHNICAL FIELD

The present invention relates generally to computer pointing devices, and more specifically, to a system and method for sharing the use of data lines in a cursor control device.

BACKGROUND OF THE INVENTION

Computers are used in many applications. To position a cursor on a computer display and/or to enter commands, a computer pointing device is typically used. Pointing devices have been developed for two different interface types within the host computer. Until recently, both interface types required a specialized computer pointing device. For example, a pointing device such as a mouse was introduced in a version operable with a RS-232 interface on the computer, and also in a separate version operable with a PS/2 or mouse port interface on the computer. Subsequently, combination pointing devices, capable of operation with more than one type of interface, were introduced. The combination pointing device was connected directly to the PS/2 port by a wire cable and to the serial port by the wire cable and an adaptor. However, in some applications the combination pointing devices must have the capability of sharing the use of wires in the wire cable depending on the type of interface to which they are connected. Therefore, it can be appreciated that there is a significant need for a combination computer pointing device that automatically shares the use of wires depending on the interface type to which it is connected. The present invention provides this and other advantages as will be illustrated by the following description and accompanying figures.

SUMMARY OF THE INVENTION

The present invention is embodied in a system and method for the shared use of data lines in a cursor control device alternatively coupled through a wire cable to an interface having one of a first or second interface type. The system includes a first wire in a wire cable to carry a first signal if the cursor control device is coupled to the first interface type and to carry a second signal if the cursor control device is coupled to the second interface type. The system also includes a second wire in a wire cable providing a reference voltage, and a voltage clamp between the first and second wires in the wire cable to thereby limit the voltage of the first signal.

BRIEF DESCRIPTION OF THE DRAWINGS

FIG. 3A is a functional block diagram illustrating the connection of a conventional combination pointing device to a PS/2 interface.

FIG. 3B is a functional block diagram illustrating the connection of the conventional combination pointing device to a serial interface using a conventional adapter.

DETAILED DESCRIPTION OF THE INVENTION

Figure 1:
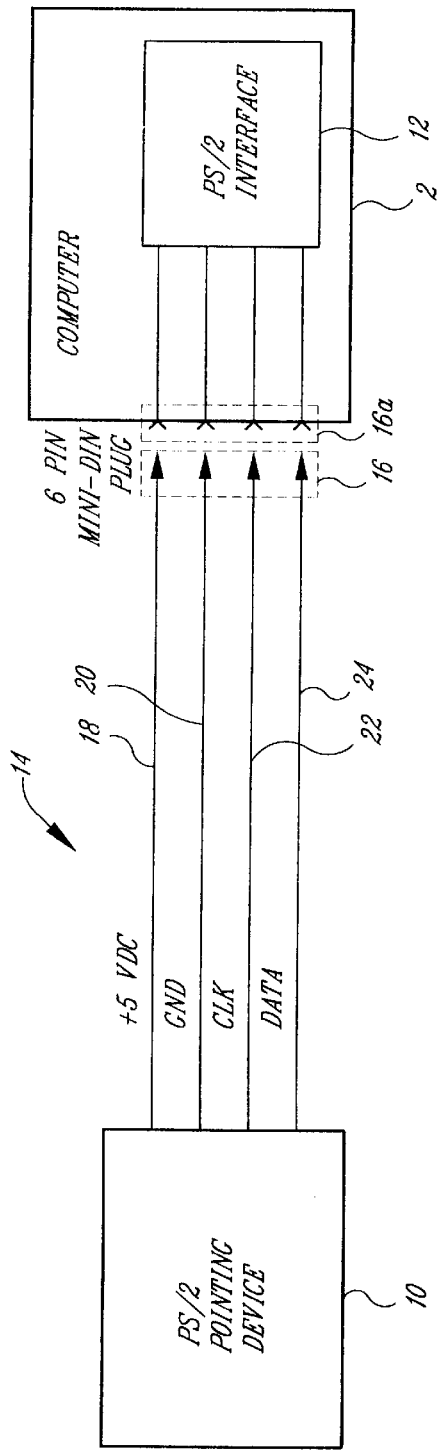
FIG. 1 is a functional block diagram illustrating the connection of a conventional PS/2 pointing device to a PS/2 interface.

Different types of computer input devices have been specifically designed to operate with a particular interface within a computer 2, as illustrated in FIG. 1. A PS/2™ pointing device 10 is coupled to a PS/2 interface 12 using a cable 14 and an industry standard six pin mini-DIN plug 16. The term "PS/2" is a trademark of International Business Machines. The six pin mini-DIN plug 16 connects with a corresponding six pin mini-DIN connector 16a on the computer 2. The cable 14 for the PS/2 pointing device 10 includes a +5 volts DC (VDC) line 18 as well as a ground (GND) line 20. The +5 VDC and ground lines 18 and 20, supply power to the PS/2 pointing device 10. The PS/2 pointing device 10 generates position data as a result of user input to the pointing device. For example, if the PS/2 pointing device 10 is a mouse, the mouse generates position data in response to user movement of the mouse. The position data generated by the PS/2 pointing device 10 as well as data related to the position of one or more buttons (not shown) is transmitted to the PS/2 interface 12 using a clock (CLK) line 22 and a data (DATA) line 24. The operation of the PS/2 pointing device 10 is well-known to those skilled in the art and need not be described in greater detail herein.

Figure 2:
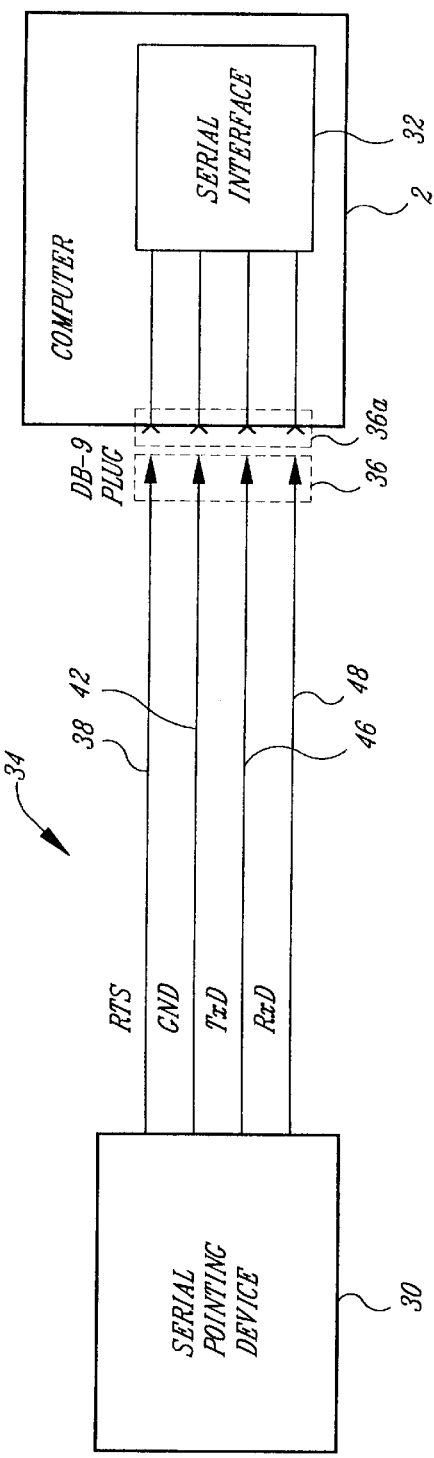
FIG. 2 is a functional block diagram illustrating the connection of a conventional serial pointing device to a serial interface.

Other computer pointing devices include a serial pointing device 30, illustrated in FIG. 2. The serial pointing device 30 is coupled to a serial interface 32, such as an RS-232 interface, within the computer 2 using a cable 34 and an industry standard D-Sub 9 plug 36. The D-Sub 9 plug 36 connects with a corresponding DB-9 connector 36a on the computer 2. The cable 34 includes a "Request to Send" (RTS) line 38. The RTS line 38 is a control line used in a conventional serial port. However, the typical serial pointing device 30 does not use such a control line. Instead, the RTS line 38 is used to supply a positive voltage to the serial pointing device 30. The positive voltage supplied to the serial pointing device typically ranges from +5 VDC to +12 VDC.

The cable 34 also includes a TxD data line 46 and a RxD data line 48. The TxD data line 46 typically carries data from the serial interface 32 to a peripheral. However, the conventional serial pointing device 30 is a send only device, and does not receive data on the TxD data line 46. Rather, the TxD data line 46 is used to carry a negative voltage required by the serial interface 32. The negative voltage typically ranges from −5 VDC to −12 VDC. The cable 34 also includes a ground (GND) line 42, which is used by the serial interface 32 in supplying power to the serial pointing device 30 together with the supply voltage on the RTS line 38 and the TxD data line 46.

The serial pointing device 30 transmits data to the serial interface 32 using the RxD data line 48. Data transmitted from the serial pointing device 30 includes positional data as well as data related to the position of one or more buttons (not shown) on the serial pointing device. The operation of the serial pointing device 30 is well known in the art and need not be described in any greater detail herein.

A conventional combination pointing device 50 is illustrated in FIGS. 3A and 3B. The combination pointing device 50 has circuitry (not shown) that allows it to function as either the PS/2 pointing device 10 (see FIG. 1) or the serial pointing device 30 (see FIG. 2). The user can connect the combination pointing device 50 directly to the PS/2 interface 12 using a conventional six pin mini-DIN plug 56, as illustrated in FIG. 3A. The six pin mini-DIN plug 56 connects with a corresponding six pin mini-DIN connector 56a on the computer 2. The combination pointing device 50 includes a six conductor cable 60 that contains wires for use with either the PS/2 interface 12 or the serial interface 32.

When the combination pointing device 50 is coupled to the PS/2 interface 12, there are four wires within the cable 60 that are required for proper operation with the combination pointing device. A $V_{cc}$/RTS line 62 provides power to the combination pointing device 50 from the PS/2 interface 12. As will be discussed below, the $V_{cc}$/RTS line 62 is used by the combination pointing device 50 when coupled to either the PS/2 interface 12 or the serial interface 32 (see FIG. 3B). A ground (GND) line 64 also is used in supplying power from the PS/2 interface 12 to the combination pointing device 50. A clock (CLK) line 66 carries a clock signal generated by the combination pointing device 50 to synchronize the transfer of data to the PS/2 interface 12. A DATA line 68 is used in conjunction with the CLK line 66 to transfer data from the combination pointing device 50 to the PS/2 interface 12. The data carried by the DATA line 68 includes both positional data and data related to the position of one or more buttons (not shown) on the combination pointing device 50. In addition, the cable 60 includes a TxD line 70 and an RxD line 72. While the TxD line 70 and the RxD line 72 are included in the cable 60, they are not used when the combination pointing device 50 is coupled to the PS/2 interface 12. However, as will be discussed below, the TxD line 70 and RxD line 72 are used when the combination pointing device 50 is coupled to the serial interface 32.

If the user wishes to use the combination pointing device 50 with the serial interface 32, an adapter 58 is used to couple the combination pointing device 50 to the serial interface 32 as shown in FIG. 3B. The adapter 58 includes a six pin mini-DIN connector 56a and a D-Sub 9 plug 76. The six pin mini-DIN plug 56 on the combination pointing device 50 connects to the six pin mini-DIN connector 56a of the adapter 58, while the DB-9 plug 76 of the adapter connects to a corresponding DB-9 connector 76a on the computer 2 with the serial interface 32.

As previously discussed, the TxD line 70 and RxD line 72 are used by the combination pointing device 50 when connected to the serial interface 32 using the adapter 58. In addition to the TxD line 70 and the RxD line 72, the adapter 58 connects the $V_{cc}$/RTS line 62 and the GND line 64 to the serial interface 32. It should be noted that, in some cases, a serial version of the combination pointing device is provided by the manufacturer with the DB-9 plug 76 for direct connection to the serial interface 32. In this situation, an adapter (not shown) is provided to convert the DB-9 plug 76 on the serial version of the combination pointing device 50 to the six pin mini-DIN plug 56 for operation with the PS/2 interface 12. The DB-9 plug 76 to six pin mini-DIN plug 56 adapter (not shown) connects the same wires to the PS/2 interface 12, as previously discussed with respect to FIG. 3A. Similarly, the serial version of the combination pointing device 50 with the DB-9 plug 76, which is not illustrated herein, connects the lines of the cable 60 in the manner discussed above with respect to FIG. 3B directly to the serial interface 32 without the need for the adapter 58. However, the combination pointing device 50, and the data signals connected thereto, are used in the manner previously discussed.

As discussed above, the combination pointing device 50 has circuitry to allow it to operate with the PS/2 interface 12 (see FIG. 3A) or with the serial interface 32 (see FIG. 3B). For proper operation, electrical circuitry (not shown) in the combination pointing device must determine whether the combination pointing device 50 is coupled to the PS/2 interface 12 or to the serial interface 32. The combination pointing device 50 uses lines within the adapter 58 to determine whether the adapter is used or not. Specifically, the CLK line 66 is shorted to the DATA line 68 within the adapter 58. The circuitry in the combination pointing device 50 sends a signal out on the CLK line 66 and examines the DATA line 68 to determine whether they are connected or not. If the CLK line 66 and the DATA line 68 are connected, the combination pointing device 50 interprets this as an indication that the combination pointing device is coupled to the serial interface 32. Accordingly, the circuitry in the combination pointing device 50 formats the data for transmission to the serial interface 32. If the CLK line 66 and the DATA line 68 are not coupled together, the circuitry in the combination pointing device 50 interprets this as an indication that the combination pointing device is coupled to the PS/2 interface 12. Accordingly, the circuitry in the combination pointing device 50 formats the data for transmission to the PS/2 interface 12.

The drawback of the prior art system illustrated in FIGS. 3A and 3B is that the CLK line 66 and the DATA line 68 must be shorted together within the adapter 58. Because the CLK line 66 and the DATA line 68 are shorted together, these lines are not available for other purposes. As discussed above, some of the lines within the cable 60 are used to carry power to the combination pointing device 50. For example, the TxD line 70 carries negative voltage from the serial interface 32 to the combination pointing device 50. Similarly, the $V_{cc}$/RTS line 62 carries positive voltage to the combination pointing device from both the PS/2 interface 12 (see FIG. 3A) and the serial interface 32 (see FIG. 3B). The data lines discussed above are capable of carrying only a limited amount of current to the combination pointing device 50. The inability to use the CLK line 66 and the DATA line 68 limits the amount of electrical current that can be supplied to the combination pointing device 50 by the serial interface 32. In certain circumstances, the combination pointing device 50 may include additional circuitry that requires current that exceeds the supply capacity of the lines in the cable 60 that supply power to the combination pointing device 50 from the serial interface 32.

Figure 4:
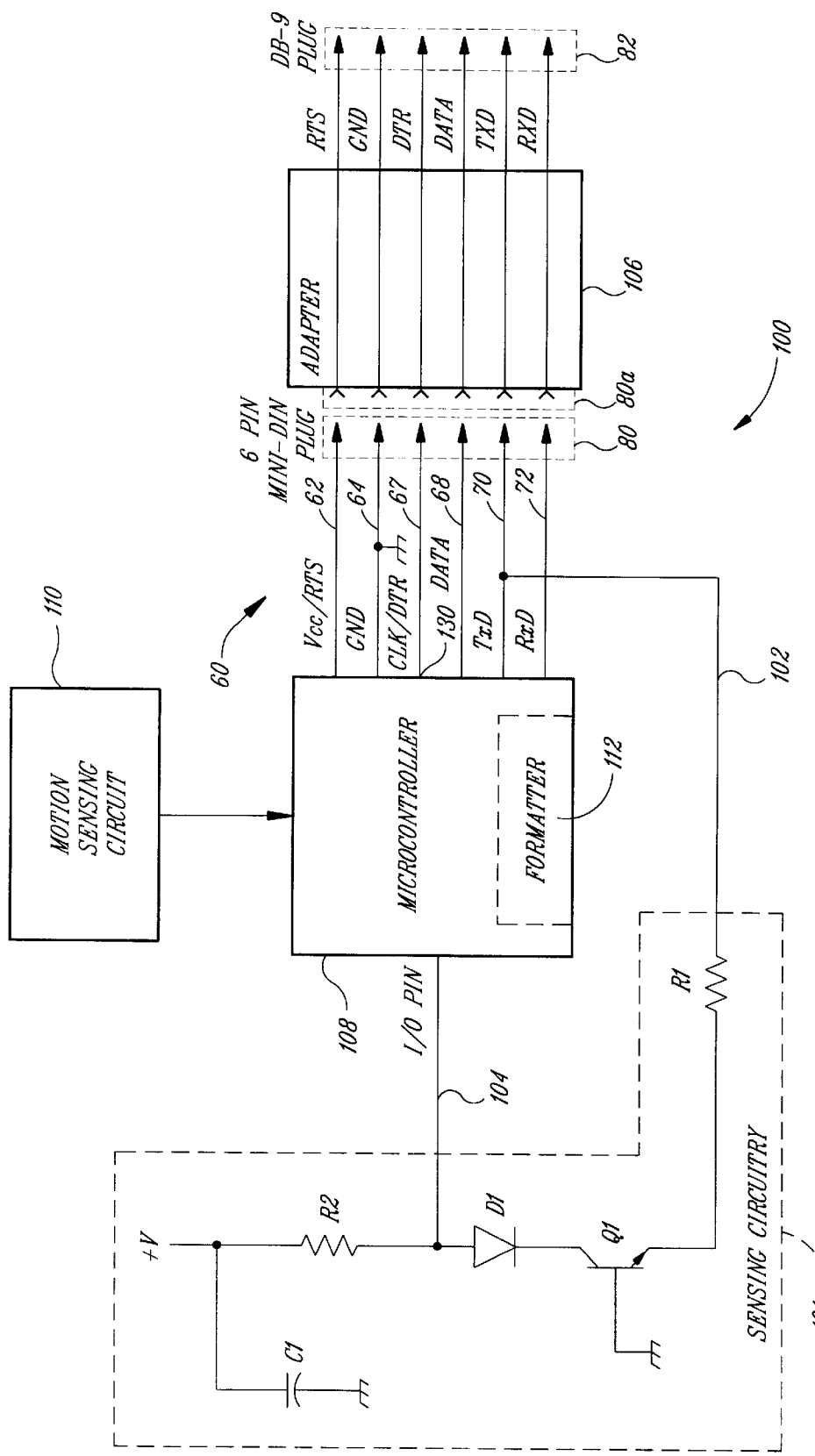
FIG. 4 is a sensing circuit according to the present invention illustrating the sensing operation to determine interface types.

The present invention uses only a single wire within the cable 60 to determine whether the combination pointing device 50 is coupled to the PS/2 interface 12 or the serial interface 32. This permits the use of additional lines within the cable 60 to supply current to the combination pointing device 50. The present invention is embodied in the circuitry for a combination pointing device 100 illustrated in FIG. 4. Electrical sensing circuitry 101 within the pointing device 100 senses whether the pointing device is coupled to the PS/2 interface 12 (see FIG. 3A) or the serial interface 32 (see FIG. 3B). A transistor $Q_1$, of the NPN type, has its base tied to circuit ground (i.e., GND). The emitter of the transistor $Q_1$ is coupled through a resistor $R_1$ to a sense line 102. The collector of the transistor $Q_1$ is tied through a diode $D_1$ to an I/O pin 104 on a microcontroller or microprocessor 108. A motion sensing circuitry 110 provides movement data to the microcontroller 108. The operation of the motion sensing circuitry 110 will be discussed below. In addition to the movement data, the combination pointing device 100 generates switch data corresponding to the position of one or more switches (not shown). The movement data and switch data is generically referred to herein as data. Those skilled in the art understand that this term includes both movement and switch data.

The I/O pin 104 on the microcontroller 108 is tied to a positive supply voltage +V through a pull-up resistor $R_2$. A filter capacitor $C_1$ connected between positive supply voltage +V and circuit ground is also included to provide a more stable voltage and eliminate noise. The pointing device 100 may be coupled to either the conventional PS/2 interface 12 (see FIG. 3A) or the conventional serial interface 32 (see FIG. 3B). As those skilled in the art can appreciate, the positive supply voltage +V is provided by the PS/2 interface 12 or the serial interface 32. If the pointing device 100 is coupled to the PS/2 interface 12, the positive supply voltage +V is +5 VDC. However, if the pointing device 100 is coupled to the serial interface 32, the positive supply voltage +V can be anywhere between +5 VDC and +12 VDC depending on the voltages supplied by the serial interface.

The sense line 102 is used to automatically determine whether the pointing device 100 is coupled to the PS/2 interface 12 or the serial interface 32. The advantage of the present invention is that it eliminates the need for the CLK line 66 and the DATA line 68 to be shorted together in the conventional adapter 58 (see FIG. 3B) to provide an indication that the combination pointing device is coupled to the serial interface 32.

The pointing device includes a CLK/DTR line 67 instead of the CLK line 66 used in the conventional combination pointing device 50. In this aspect of the present invention, the CLK/DTR line 67 provides clock signals from the pointing device 100 when coupled to the PS/2 interface 12 and supplies additional electrical power to the pointing device when coupled to the serial interface 32. Specifically, a "Data Terminal Ready" line 69 (see FIG. 3B) within the serial interface 32 provides additional positive voltage to the pointing device 100. This aspect of the pointing device will be described in detail below.

The use of the single sense line 102 allows one of the two wires previously shorted together in the prior art adapter 58 to be used for other purposes, as will be discussed below. If the sense line 102 is coupled to the PS/2 interface 12, the sense line will have a voltage level between 0 VDC and +5 VDC. Under such circumstances, transistor $Q_1$ is not turned on, and the pull-up resistor $R_2$ causes a high logic level to appear on the I/O pin 104. The microcontroller 108 interprets the high voltage level on the I/O pin 104 as an input to indicate that the pointing device 100 is connected to the PS/2 interface 12. A formatter 112 within the microcontroller 108 subsequently configures the data for transmission to the PS/2 interface 12 in a conventional manner.

The present invention also includes an adapter 106 having a six pin mini-DIN connector 80a corresponding to a six pin mini-DIN plug 80 on the pointing device 100 and a DB-9 plug 82 to connect to the DB-9 connector 76a on the computer 2 with the serial interface 32 (see FIG. 3B). The adapter 106 is similar to the conventional adapter 58 except that the CLK/DTR line 67 and the DATA line 68 are not shorted together in the adapter 106. As will be discussed in detail below, the sensing circuitry 101 detects the connection of the pointing device 100 to the serial interface 32 using the TxD line 70. Thus, the present invention does not require shorting together of pins in the adapter 106. This permits both the CLK/DTR line 67 and the DATA line 68 to be used for other purposes when the pointing device 100 is connected to the serial interface 32.

If the pointing device 100 is coupled to the serial interface 32, the sense line 102 will be at a voltage between −5VDC and −12VDC depending on the particular voltages used in the serial interface. The negative voltage on the sense line 102 causes the transistor $Q_1$ to turn on, thus pulling the I/O pin 104 to a low logic level. The microcontroller 108 interprets the low logic level on the I/O pin 104 as an indication that the pointing device 100 is connected to the serial interface 32. The formatter 112 within the microcontroller 108 formats the data for transmission to the serial interface 32 in a conventional manner. The precise manner in which the data is encoded for transmission to the PS/2 interface 12 or the serial interface 32 is well known in the art and will not be described herein.

The advantage of the sensing circuitry 101 is that only a single line (i.e., the sense line 102) is used to sense whether the pointing device 100 is coupled to the PS/2 interface 12 or the serial interface 32. The values of the resistors $R_1$ and $R_2$ are selected so that the transistor $Q_1$ is saturated when the sense line 102 is at a −5VDC to −12VDC level. While in saturation, the collector of the transistor $Q_1$ is approximately a diode drop below ground. The diode $D_1$ serves to assure that the voltage on the I/O pin 104 does not go below ground. In the presently preferred embodiment, the sense line 102 is coupled to the TxD line 70. As described with respect to FIG. 3A, the TxD line 70 is not used by the PS/2 interface 12. Therefore, the sense line 102 is floating when the pointing device 100 is connected to the PS/2 interface 12. The sense line 102 will float between 0VDC and +5VDC, which will prevent the transistor $Q_1$ from turning on, as discussed above. When the pointing device is coupled to the serial interface 32, the TxD line 70 will be between −5VDC and −12VDC, thus causing the transistor $Q_1$ to turn on.

Because the TxD line 70 is used to sense the connection to the PS/2 interface 12 or the serial interface 32, the CLK/DTR line 67 and DATA line 68 do not need to be shorted together in the adapter 106 as required in the prior art adapter 58. This allows both the CLK/DTR line 67 and DATA line 68 to be used for purposes other than sensing whether the pointing device 100 is connected to the PS/2 interface 12 or the serial interface 32. For example, the CLK/DTR line 67 can be used to supply additional current to the pointing device 100, as will be described below.

In the presently preferred embodiment, the electrical sensing circuitry 101 is incorporated into the pointing device 100. The microcontroller 108 is used to calculate the movement data of the pointing device 100 in addition to sensing the interface type and formatting the data.

Figure 5:
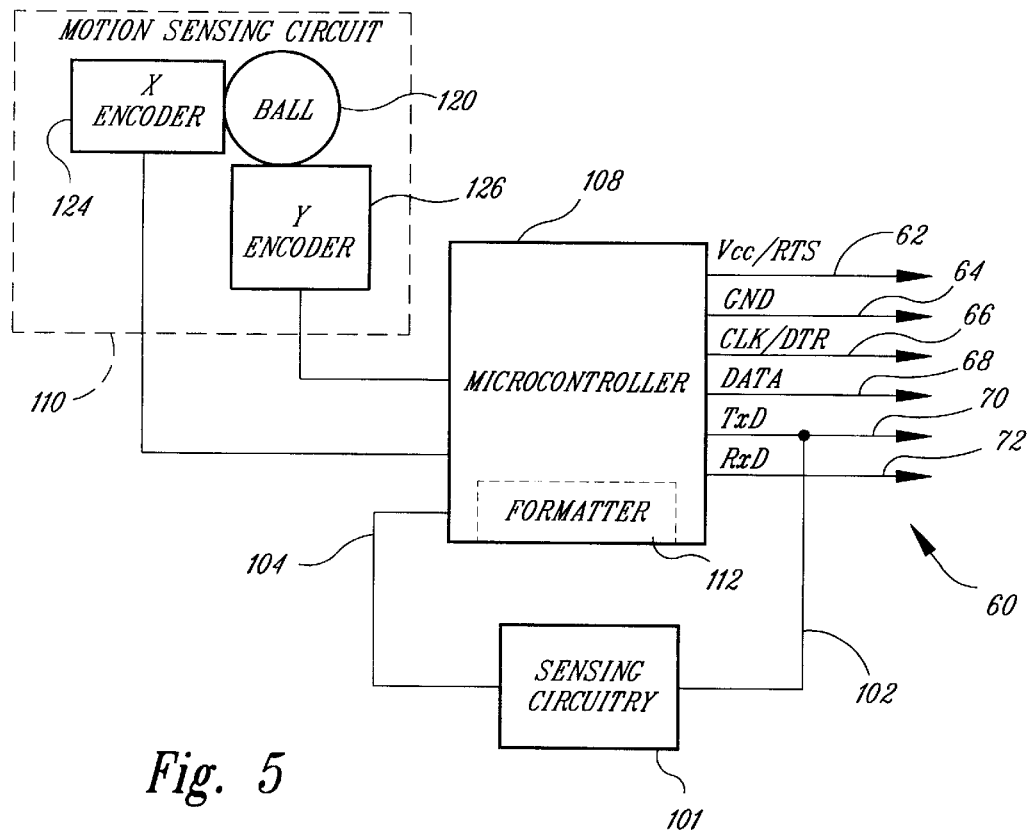
FIG. 5 is a functional block diagram of a combination pointing device incorporating the sensing circuit of FIG. 4.

The motion sensing circuitry 110 used by the pointing device 100 is illustrated in the functional block diagram of FIG. 5. The example in FIG. 5 illustrates the operation of the pointing device 100 as a mouse or a trackball. As those skilled in the art will readily appreciate, the operation of a mouse and a trackball are similar. The motion sensing circuitry 110 detects the rotational movement of a ball 120, as rotated by a user. An X encoder 124 and a Y encoder 126 are used to detect the rotational movement of the ball 120. The X encoder 124 and Y encoder 126 are orthogonally positioned with respect to each other so that the rotational movement of the ball 120 is detected in two orthogonal directions, designated herein as the X direction and the Y direction. The rotation of the ball 120 in the X direction is detected by the X encoder 124, while the rotation of the ball 120 in the Y direction is detected by the Y encoder 126. The X encoder 124 and the Y encoder 126 use optocouplers (not shown) to sense the rotation of the ball 120. The use of optocouplers in the motion sensing circuitry 110 is well known in the art, and need not be described in detail herein.

The data generated by the X encoder 124 and the Y encoder 126 are transferred to the microcontroller 108. The microcontroller 108 uses the data to determine the rotational movement of the ball 120. As discussed above, the microcontroller 108 also determines whether the pointing device 100 is coupled to the PS/2 interface 12 or the serial interface 32. The formatter 112 formats the data corresponding to the rotational movement of the ball 120 into the proper PS/2 or serial format for transmission to either the PS/2 interface 12 or the serial interface 32.

Figure 6A:
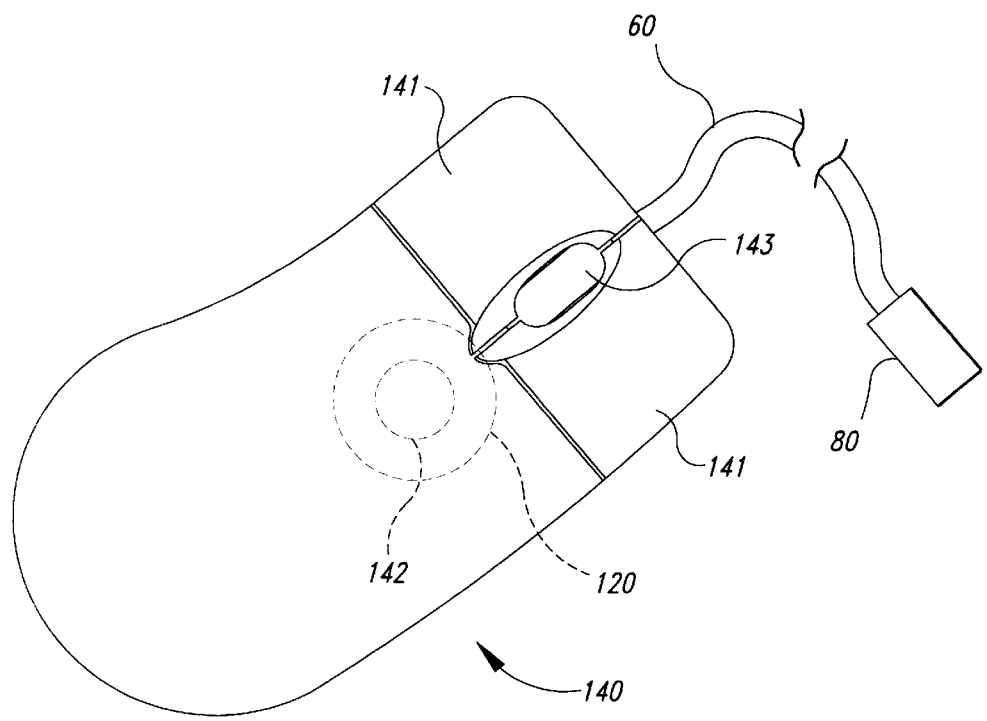
FIG. 6A illustrates a three-dimensional mouse incorporating the sensing circuit of FIG. 4.
Figure 6B:
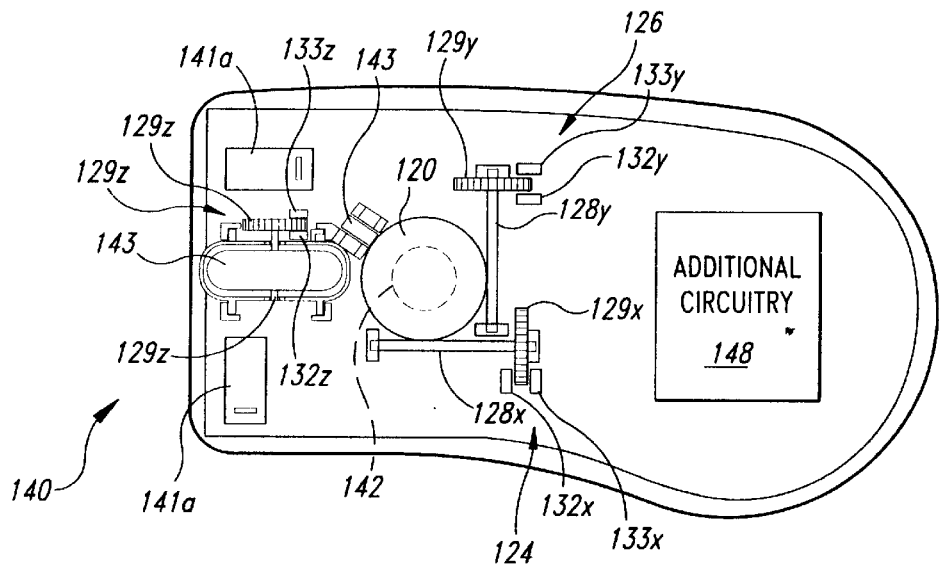
FIG. 6B illustrates the use of the present invention with the three-dimensional mouse of FIG. 6A.
Figure 6C:
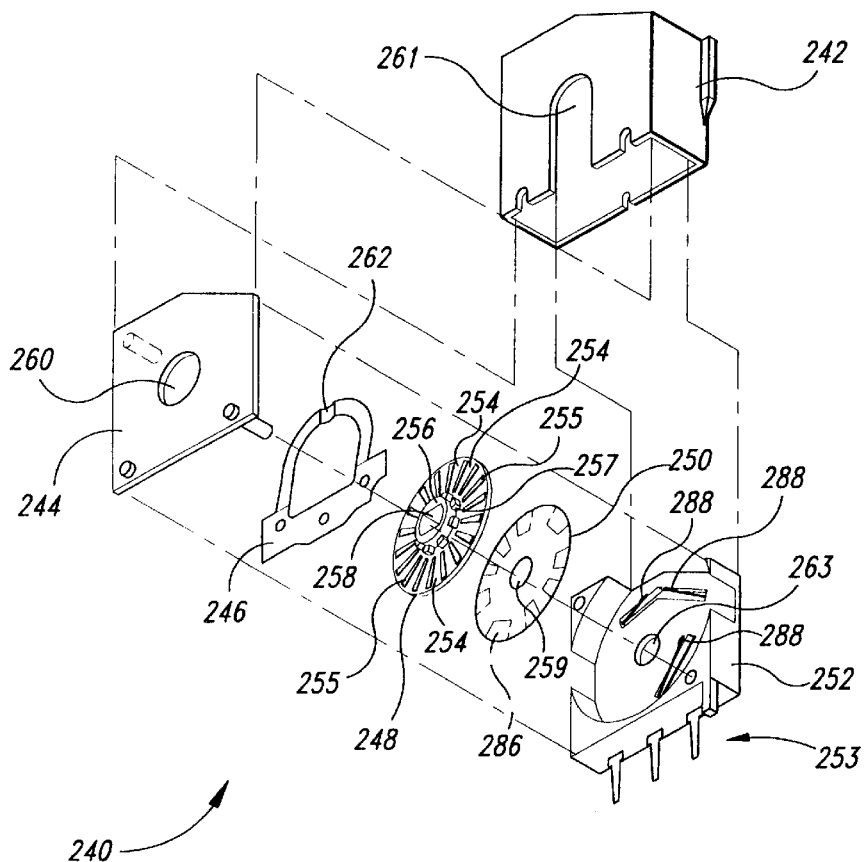
FIG. 6C illustrates one embodiment of an encoder of the three-dimensional mouse of FIG. 6A.

FIGS. 6A to 6C illustrate a mouse 140 incorporating the electrical sensing circuitry 101. The ball 120 projects downward through an aperture 142 in a bottom portion of the mouse 140 and rotates as the user moves the mouse over a surface. In addition to the conventional X-Y encoding of ball rotation, the mouse 140 includes two buttons 141 and a third encoder mechanism wheel 143 operable by the user independent of any rotation of the ball 120. Thus, the mouse 140 may be considered a three-dimensional (3-D) mouse because it encodes three independent axes of movement. As will be described in greater detail below, the 3-D mouse 140 requires additional circuitry to encode movement of the third encoder mechanism wheel 143. Complete operational details of the 3-D mouse 140 may be found in copending U.S. application Ser. No. 08/614,147, filed on Mar. 12, 1996 for a "System and Method of Adjusting Display Characteristics of a Displayable Data File Using an Ergonomic Computer Input Device," which is incorporated herein by reference in its entirety.

FIG. 6B illustrates an example of the electrical circuitry used by the 3-D mouse 140. As the user moves the 3-D mouse 140 across a surface, the ball 120, which extends through the aperture 142 in the bottom of the 3-D mouse, rotates. The X encoder 124 detects rotation of the ball 120 in one dimension while the Y encoder 126 detects rotation of the ball in a second orthogonal dimension. The X encoder 124 includes an encoder shaft 128x which is rotatably mounted within the 3-D mouse 140 and contacts the ball 120. The encoder shaft 128x of the X encoder detects rotation of the ball 120 in the X direction. An encoder wheel 129x is axially fixed to an end of the encoder shaft 128x and rotates with the encoder shaft. The encoder wheel 129x contains a series of radially extending slots. An optical source 132x, such as a light emitting diode, is positioned on one side of the encoder wheel 129x. An optical sensor 133x, such as a phototransistor, is positioned opposite the optical source 132x on the other side of the encoder wheel 129x. As the encoder wheel 129x rotates, light from the optical source 132x is alternatively blocked and transmitted through the encoder wheel 129x and received by the optical sensor 133x depending on whether one of the radial slots in the encoder wheel 129x is positioned between the optical source 132x and the optical sensor 133x. In this manner, rotation of the ball 120 in the X direction is translated into a series of electrical signals.

Similarly, the Y encoder 126 also includes an encoder shaft 128y, an encoder wheel 129y, an optical source 132y and an optical sensor 133y. The Y encoder 126 operates in a manner identical to that described above with respect to the X encoder 124 except that the Y encoder translates rotational movement of the ball 120 in the Y direction into a series of electrical signals. A spring-biased roller 134 is positioned in the 3-D mouse 140 at a location opposite to an interior angle formed by the perpendicularly positioned encoder shafts 128x and 128y and biases the ball 120 into contact with the encoder shafts and toward the interior angle, while allowing the ball to freely rotate, and cause the encoder shafts 128x and 128y and the encoder wheels 129x and 129y to rotate.

The 3-D mouse 140 also includes two switches 141a which are activated by the buttons 141 (see FIG. 6A). In addition to the X encoder 124 and Y encoder 126, the 3-D mouse 140 includes the third encoder mechanism wheel 143 and a Z encoder 127 to encode rotational movement of the third encoder mechanism wheel. The third encoder mechanism wheel 143 is rotatably retained within the 3-D mouse 140. The third encoder mechanism wheel 143 rotates on an encoder shaft 128z. A slotted encoder wheel 129z is positioned between an optical source 132z and an optical sensor 133z to generate a series of electrical signals based on rotation of the third encoder mechanism wheel 143. Thus, the 3-D mouse 140 provides three encoders, two of which encode the rotational movement of the ball 120, with the Z encoder 127 encoding rotational movement of the third encoder mechanism wheel 143. The 3-D mouse 140 also requires additional circuitry 148 to convert the electrical signals generated by the optical sensors 133x, 133y, and 133z into signals for transmission to the computer 2 (see FIGS. 3A and 3B). The additional circuitry 148 includes the microcontroller 108 (see FIG. 5), the formatter 112, the sensing circuitry 101, and the like. While the optical components described above are used to encode rotational movement of the ball 120 and the third encoder mechanism wheel 143, other encoders such as potentiometers, synchro-resolvers, electro-mechanical switches and the like may be used in the 3-D mouse 140.

For example, in one embodiment, the Z encoder 127 uses an electro-mechanical transducer 240, illustrated in FIG. 6C, to encode the position of the third encoder mechanism wheel 143 (see FIG. 6B). The electro-mechanical transducer 240 is contained within an encoder enclosure 242 which includes an inverted U-shaped slot 261, which is axially aligned with the encoder shaft 128z. The electro-mechanical transducer 240 also includes an outer plate 244, a biased engagement member 246, a tactile feedback disk 248, an encoder ring 250 (affixed to the tactile feedback disk) and an encoder electrode frame 252, all sandwiched together and received within a downward opening aperture in the encoder enclosure 242. The encoder electrode frame 152 includes a plurality of electrodes 253 that couple the electro-mechanical transducer 240 to a printed circuit board (not shown) within the 3-D mouse 140.

The tactile feedback disk 248 has a number of radially extending detents 255 (e.g., eighteen). The detents 255 are equally spaced apart and circumferentially distributed about the tactile feedback disk 148 to form an equal number of valleys 254 therebetween. A hub 256 extends from both sides of the tactile feedback disk 248. The hub 256 has a shoulder defined by gear teeth 257 on a side toward the outer plate 244, and axially formed, generally rectangular receiving aperture 148 sized to receive and operatively engage a rectangular cross-section (not shown) of the encoder shaft 128z. Thus, the electro-mechanical transducer 240 rotates with the encoder shaft 128z in response to rotational movement of the third encoder mechanism wheel 143. A portion of the hub 256 extending beyond the gear teeth 257 freely rotates within a round aperture 260 formed in the outer plate 244. The round aperture 260 of the outer plate 244 is revealed through the U-shaped slot 260 formed in the encoder enclosure 242. The hub 256 extending from a side of the tactile feedback disk 248 toward the encoder ring 250 passes through an aperture 259 therein and is received and freely rotates within a round aperture 263 formed in the encoder electrode frame 252.

The biased engagement member 246 is secured to the outer plate 244, and has an integrally formed protrusion 262 that extends toward, and is received within the valleys 254 between the detents 255 of the tactile feedback disk 248. In operation, when the third encoder mechanism wheel 143 is rotated, the rectangular cross-section hub portion (not shown) of the encoder shaft 128z mates with and causes the hub 256 to rotate freely within the round aperture 260 of the outer plate 244 and the round aperture 263 of the encoder electrode frame 252. The spring force of the biased engagement member 246, and the shape of the protrusion 262, valleys 254, and detents 255 forced the third encoder mechanism wheel 143 into discrete positions (e.g., eighteen corresponding to eighteen valleys 154 and the detents 155) during rotation of the third encoder mechanism wheel.

When the user rotates the third encoder mechanism wheel 143, the tactile feedback disk and the encoder ring 250 affixed thereto, rotates. The encoder wheel 250 is formed of an electrically conductive material and has radially projecting, equally spaced, insulative portions 286 (shown in dashed lines) in FIG. 6C. Three brush electrodes 288 secure to the encoder electrode frame 252 alternatively conduct and do not conduct as the insulative portions 286 sweep past the electrodes while the encoder wheel 250 rotates, as is known in the art. As the encoder wheel 250 rotates, the brush electrodes 288 produce Z axis quadrature signals ZA and ZB. The use of quadrature signals to determine a rotational direction is well known. Conventional optical encoders, such as the X encoder 124 (see FIG. 6B) and the Y encoder 126, commonly employ this technique to determine the rotational direction of the ball 120. Similarly, the additional circuitry 148 (see FIG. 6B) can use the quadrature signals generated by the electro-mechanical encoder 240 in an identical manner to optical encoders to determine the direction and magnitude of rotation of the third encoder mechanism wheel 143 using the quadrature signals.

As can be appreciated by those of ordinary skill in the art, the additional circuitry employed by the 3-D mouse 140 to encode the position of the third encoder mechanism wheel 143 requires additional electrical power. The PS/2 interface 12 (see FIG. 3A) typically has sufficient electrical power capacity to supply electrical power to the additional circuitry 148. However, the serial interface 32 (see FIG. 3B) has only limited current capacity on the RTS line. Therefore, the present invention provides a technique for extracting additional power from the serial interface 32 in order to provide adequate power for the additional circuitry 148.

Figure 7:
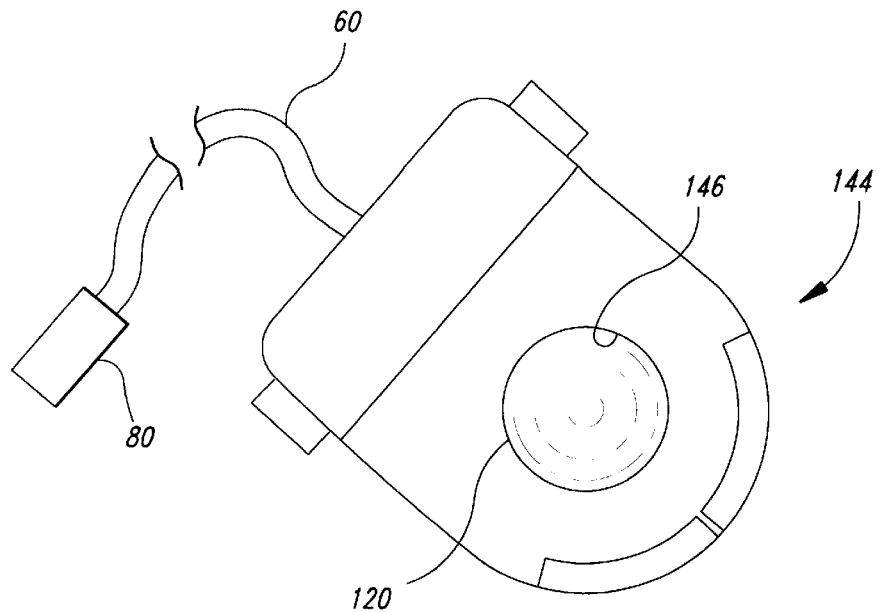
FIG. 7 illustrates a trackball incorporating the sensing circuit of FIG. 4.

FIG. 7 illustrates a trackball 144 incorporating the electrical sensing circuitry 101. The ball 120 projects upward through an aperture 146 in an upper portion of the trackball 144 and is directly manipulated by the user. The trackball 144 may also include the third encoder mechanism wheel 143 described above for the 3-D mouse 140. The general operation of the 3-D mouse 140 and the trackball 144 are similar and the operation of the trackball need not be described in further detail herein. Those skilled in the art will also appreciate that the pointing device 100 may be a joystick, game pad, or the like. The present invention is not limited to the specific form of the pointing device 100.

Figure 8:
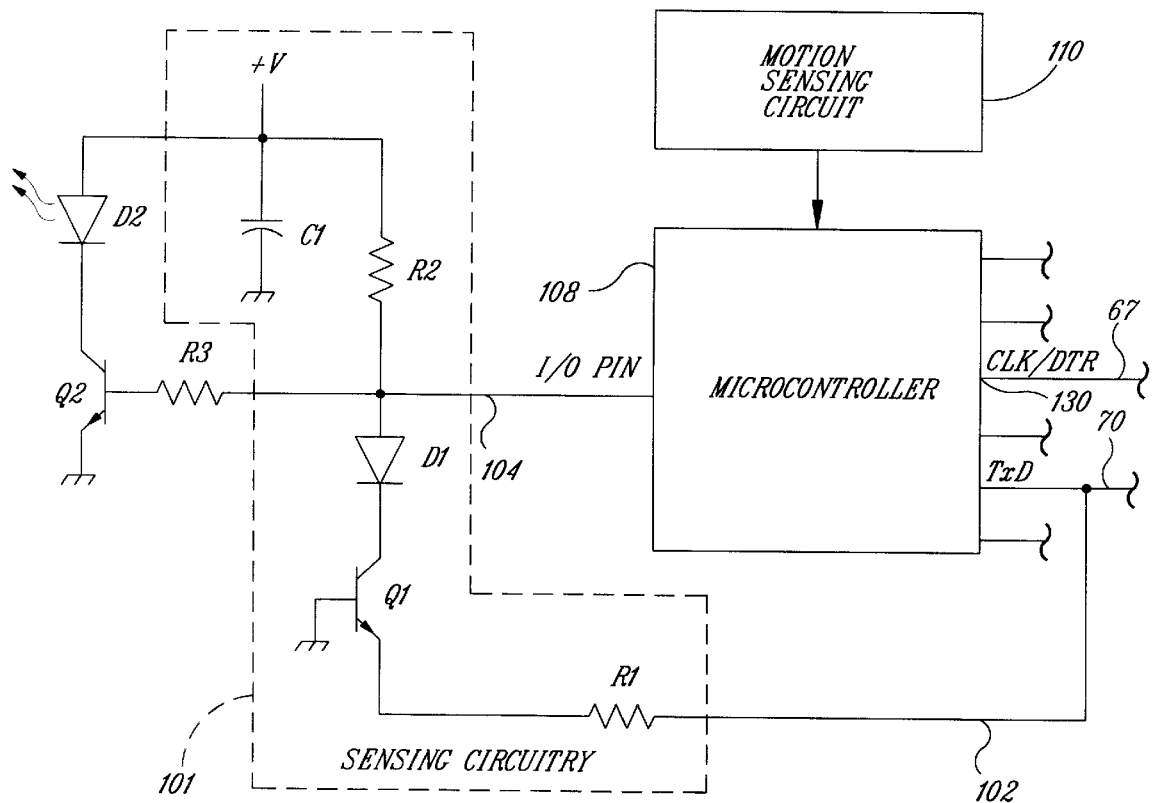
FIG. 8 is an electrical circuit showing the use of the I/O pin in the sensing circuit of FIG. 4 when used for multi-tasking operations.

As those skilled in the art can appreciate, the cost of the microcontroller 108 is directly proportional to the number of pins required on the microcontroller integrated circuit itself. Therefore, it is desirable to use the pins for multiple functions whenever possible. The present invention permits the use of the I/O pin 104 for multitasking, thus reducing the number of pins and the overall cost of the microcontroller 108. This aspect of the invention is illustrated in FIG. 8 where a second transistor $Q_2$, of the NPN-type, has its base coupled to the I/O pin 104 through a resistor $R_3$. The emitter of the transistor $Q_2$ is coupled to circuit ground. The collector of the transistor $Q_2$ is coupled to a light emitting diode $D_2$, which is part of an optocoupler in the motion sensing circuitry 110 (see FIG. 4). The operation of optocouplers in the pointing device 100 are well known, and will not be described herein.

The microcontroller 108 generates a pulse train at the I/O pin 104 to periodically activate the transistor $Q_2$, which, in turn, activates the light emitting diode $D_2$, thus minimizing the overall use of power in the motion sensing circuitry 110. The transistor $Q_2$ acts, in effect, as a strobe line for the light emitting diode $D_2$. The use of such strobe lines to conserve power in the motion sensing circuitry 110 is well known in the art, and will not be described herein. Furthermore, the strobing function of transistor $Q_2$ in FIG. 8 is merely an example of the multitasking operations that can be performed by the I/O pin 104. The present invention is directed to the multitasking ability of the I/O pin 104 and is not limited by the specific application to which the multitasking capabilities are applied.

The transistor $Q_2$ can operate whether the pointing device 100 is connected to the PS/2 interface 12 or the serial interface 32. As previously described, the transistor $Q_1$ is turned off when the pointing device 100 is coupled to the PS/2 interface 12. The resistors $R_2$ and $R_3$ are selected to allow the transistor $Q_2$ to be turned on by a high logic level generated by the microcontroller 108 at the I/O pin 104 and turned off by a low logic level at the I/O pin. The transistor $Q_1$ is turned on when the pointing device 100 is coupled to the serial interface 32. In such circumstances, the microcontroller 108 can generate sufficient current drive capacity at the I/O pin 104 to turn on the transistor $Q_2$. Thus, the I/O pin 104 can be used for multitasking operations regardless of the interface type to which the pointing device 100 is connected. Other pins of the microcontroller 108 can also be used to perform multiple tasks. For example, an I/O pin 130 on the microcontroller is used to generate clocking signals for the CLK/DTR line 67. As will be discussed below in greater detail, the CLK/DTR line 67 is used to supply extra current to the pointing device 100 when coupled to the serial interface 32.

The electrical sensing circuitry 101 is operational whenever the pointing device 100 is connected to the PS/2 interface 12 or the serial interface 32. However, the microcontroller 108 need only check the interface type when the computer 2 (see FIGS. 3A and 3B) is initially powered up or reset. When the microcontroller 108 determines the type of interface to which the pointing device 100 is connected, the formatter 112 formats the data for transmission to the appropriate interface type. This interface type will not change during normal operation of the computer 2. If the user disconnects the pointing device 100 and reconnects it to an interface of a different type, the computer 2 must undergo a hardware reset procedure or require the user to manually intervene to add a new hardware description. For example, the user can disconnect the pointing device 100 from the PS/2 interface 12 and reconnect the pointing device to the serial interface 32 using the adapter 106. Typically, such a change of interface type is done when the computer is turned off. Thus, the I/O pin 104 need only be used during initial power up or hardware reset to indicate the interface type, and immediately thereafter can be used for the multitasking functions described above.

Thus, the electrical sensing circuitry 101 provides a simple detection technique for determining the interface type to which the combination pointing device 100 is connected. This technique uses only a single sense line 102, which permits other wires within the cable 60 previously used to determine the interface type to be used for other purposes, such as carrying additional power.

Figure 9:
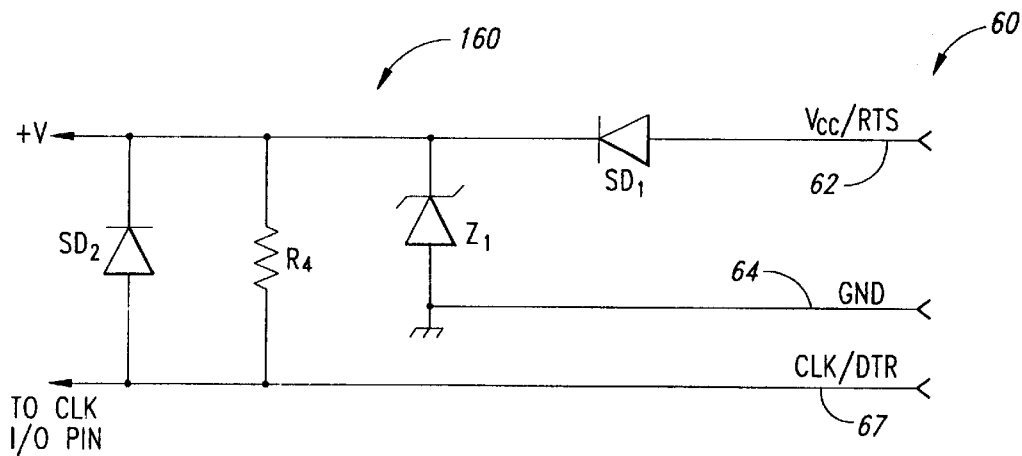
FIG. 9 is an electrical circuit illustrating the shared use of a data line in accordance with the present invention.

Electrical circuitry 160 illustrated in FIG. 9 is an example of the shared use of the CLK/DTR line 67 when the pointing device 100 is connected to the PS/2 interface 12 or the serial interface 32. The electrical circuitry 160 is located in the pointing device 100 and is coupled between the connector 80 (see FIG. 4) and the microcontroller 110. As previously discussed, the CLK/DTR line 67 is used by the pointing device 100 for a clocking signal when coupled to the PS/2 interface 12. However, in accordance with the present invention, the circuit 160 allows the use of the CLK/DTR line 67 to carry additional power by coupling the CLK/DTR line to DTR line 69 when the pointing device 100 is coupled to the serial interface 32. The CLK/DTR line 67 is illustrated in FIG. 9 as a CLK/DTR line to indicate its shared use. Other lines in the cable 60 have been omitted from FIG. 9 for the sake of clarity. In operation, the $V_{cc}$/RTS line 62 in the cable 60 provides power to the pointing device 100. If the pointing device 100 is coupled to the PS/2 interface 12, approximately +5 VDC is provided to the pointing device using the $V_{cc}$/RTS line 62. This source of electrical power is coupled to a +V supply node through a Schottky diode $SD_1$ of the circuit 160. If the pointing device 100 is coupled to the serial interface 32, the serial interface provides power ranging from +5 VDC to +12 VDC using the $V_{cc}$/RTS line 62 and is coupled to the +V supply node through the Schottky diode $SD_1$. A Zener diode $Z_1$, having a breakdown voltage of approximately 5.6 volts, is coupled to the +V supply node to regulate the voltage provided by the serial interface 32 via the $V_{cc}$/RTS line 62. Thus, the operating voltage +V in the pointing device 100 is limited by the operation of the Zener diode $Z_1$.

A second Schottky diode $SD_2$ is coupled between the CLK/DTR line 67 and the +V supply node of the pointing device 100. When the pointing device 100 is coupled to the PS/2 interface 12, the value of the +V supply node is approximately +5 VDC. Similarly, the clock signal generated by the microcontroller 108 (see FIG. 4) at the clock I/O pin 130 ranges between 0 VDC and +5 VDC. Thus, the Schottky diode $SD_2$ is never forward-biased when the pointing device 100 is coupled to the PS/2 interface 12. A pull-up resistor $R_4$ assures that proper voltages are present on the CLK/DTR line 67 when the pointing device 100 is coupled to the PS/2 interface 12. The value of resistor $R_4$ is selected to be high enough so as not to interfere with the operation of the Schottky diode $SD_2$.

When the pointing device 100 is coupled to the serial interface 32, the CLK/DTR line 67 receives a positive voltage between +5 VDC and +12 VDC from the serial interface. Under these conditions, the Schottky diode $SD_2$ is forward-biased and supplies current to the +V supply node of the pointing device 100. Similarly, the $V_{cc}$/RTS line 62 is also supplied with the positive voltage between +5 VDC and +12 VDC from the serial interface 32. Thus, the Schottky diode $SD_1$ is also forward-biased when the pointing device 100 is coupled to the serial interface 32. The result of forward-biasing the Schottky diodes $SD_1$ and $SD_2$ is that current is supplied to the +V supply node in the pointing device 100 by both the $V_{cc}$/RTS line 62 and the CLK/DTR line 67, thus effectively doubling the amount of current that can be provided to the pointing device 100 compared to prior art pointing devices.

It should be noted that at certain times, the computer 2 may set the DTR line 69 to high (+12 VDC) and the RTS line to low (-12 VDC). Thus, the signal on the CLK/DTR line 67 may be at a high voltage while the signal on the $V_{cc}$/RTS line 62 is at a low voltage. Under these conditions, the Schottky diode $SD_1$ is reverse-biased and prevents current flow on the $V_{cc}$/RTS line 62. The Schottky diodes $SD_1$ and $SD_2$ are used instead of conventional diodes because Schottky diodes have a forward-voltage drop of about 0.3 VDC thus minimizing voltage loss through the diodes. As a result, the clock signal at the clock I/O pin 130 (see FIG. 4) of the microcontroller 108 will be no greater than 0.3 volts above the supply voltage +V for the pointing device 100. This voltage-limiting condition effectively prevents the activation of conventional protection diodes (not shown) within the microcontroller 108 at the clock I/O pin 130. Thus, the circuit 160 permits the use of the CLK/DTR line 67 to double the amount of current provided to the pointing device 100 by the serial interface 32.

Figure 10:
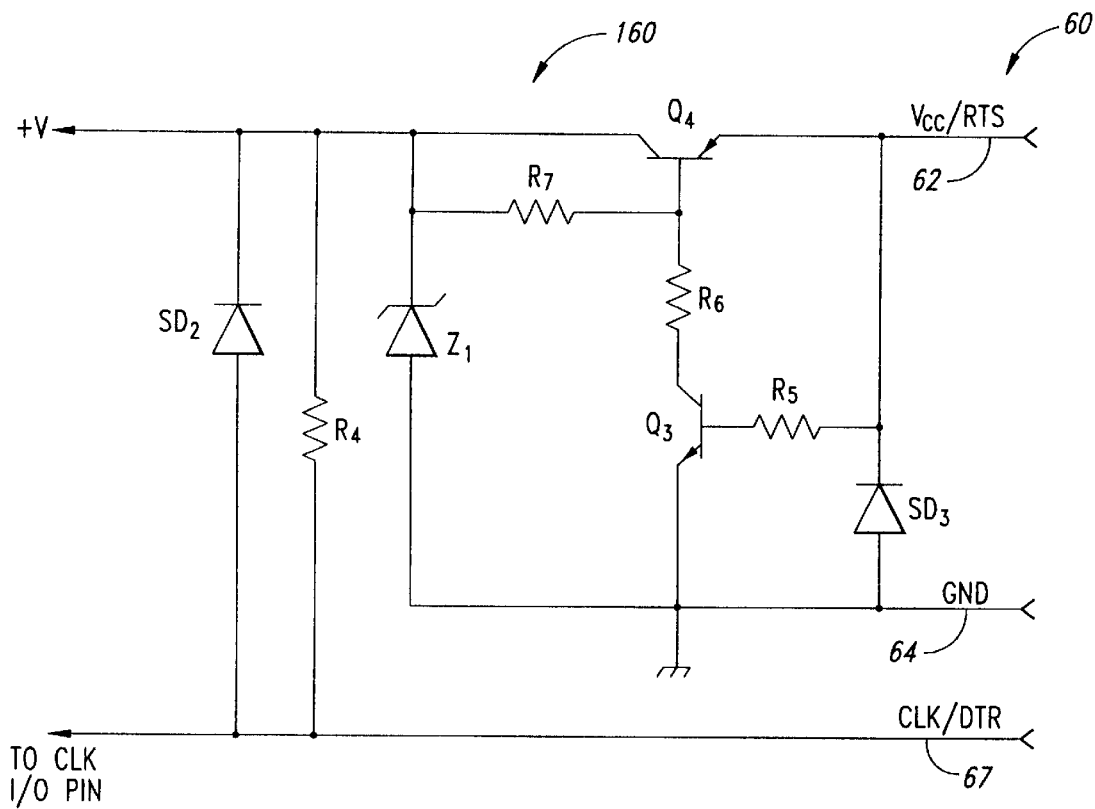
FIG. 10 is an alternative electrical circuit showing the shared use of a data line in accordance with the present invention.

An alternative embodiment of the electrical circuit is illustrated in FIG. 10. The operation of the Schottky diode $SD_2$ and the Zener diode $Z_1$ are identical to the circuit illustrated in FIG. 9 and the description of their operation will not be repeated. Other conventional components, such as pull-up resistors, pull-down resistors, or current-limiting resistors (not shown), may be used in the pointing device 100. The operation of these components is well known and need not be discussed herein.

In normal operation, the pointing device 100 will be coupled to either the PS/2 interface 12 or the serial interface 32. In either case, in the circuit 160 of FIG. 10 the voltage on the $V_{cc}$/RTS line 62 will provide a positive voltage on the base of a transistor $Q_3$ through a resistor $R_5$. The resulting activation of the transistor $Q_3$ in turn provides base current drive through resistors $R_6$ and $R_7$ for a pass transistor $Q_4$, thus activating the transistor $Q_4$ to provide current to the +V supply node of the pointing device 100. As discussed above with respect to FIG. 9, the +V supply node in the pointing device 100 receives current from both the $V_{cc}$/RTS line 62 and the CLK/DTR line 67 when the pointing device is coupled to the serial interface 32.

During times when the DTR line 69 is high (+12 VDC) and the RTS line is low (-12 VDC), the transistor $Q_4$ operates in a manner similar to the Schottky diode $SD_1$ of FIG. 9 to prevent reverse current flow on the $V_{cc}$/RTS line 62. During this period, the DTR line 69 in the serial interface 32 is high, thus presenting a positive voltage on the CLK/

DTR line 67. At the same time, the RTS line in the serial interface 32 is low, thus presenting a negative voltage on the $V_{cc}$/RTS line 62. Under such conditions, the transistor $Q_3$ is turned off, and thus provides no base current to the transistor $Q_4$. As a result, transistor $Q_4$ is also turned off and does not permit current to flow onto the $V_{cc}$/RTS line 62. Thus, the circuit 160 of FIG. 10 operates similarly to that of the circuit 160 illustrated in FIG. 9. However, the circuit of FIG. 10 has the added advantage of current limiting through the transistor $Q_4$. The value of resistor $R_6$ may be selected to provide the desired degree of current limiting. The maximum current through the transistor $Q_4$ is equal to a base current $I_B$ times the current gain $\beta$ of the transistor. The resistance value of the resistor $R_6$ can be used to set the maximum base current and thus the maximum current supplied by the transistor $Q_4$. Thus, the circuitry 160 illustrated in FIGS. 9 and 10 permit the shared use of the CLK/DTR line 67 when the pointing device 100 is coupled to either the PS/2 interface 12 or the serial interface 32.

Those skilled in the art will recognize that the principles of the present invention may be readily applied to other computer input devices, such as keyboards, joysticks, and the like, where the data entry device can be coupled to different interface types. While the interface examples presented herein are the PS/2 and RS-232 serial interfaces, those skilled in the art will readily recognize that the present invention is applicable to other interface types, such as the Universal Serial Bus.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims

What is claimed is:

1. A system to provide electrical power to a computer input device through a wire cable alternatively couplable to an interface having one of a first interface type or a second interface type, the system comprising:

a first wire in the wire cable to carry electrical power to the computer input device;

a second wire in the wire cable to carry a first signal if the computer input device is coupled to the first interface type and to carry additional electrical power to the computer input device if the computer input device is coupled to the second interface type; and a voltage clamp coupled between said first and second wires in the wire cable, said voltage clamp permitting said additional electrical power to be coupled to said first wire if the computer input device is coupled to the second interface type and preventing said first signal from being coupled to said first wire if the computer input device is coupled to the first interface type.

2. The system of claim 1 wherein said voltage clamp is a diode coupled between said first and second wires.

3. The system of claim 2 wherein said diode is a Schottky diode.

4. The system of claim 1 wherein the first interface type is a PS/2 interface and said second interface type is a serial interface, the computer input device further including a clock generator generating a clock signal on said second wire as said first signal when the cursor controller is coupled to the PS/2 interface and carrying said additional power to the computer input device when connected to the serial interface.

5. The system of claim 1 wherein said first wire carries said electrical power at a first voltage level when the computer input device is coupled to the first interface type and carries said electrical power at a second voltage level when the computer input device when connected to the second interface type, the system further including a voltage regulator to regulate said first and second voltage levels to a predetermined voltage level.

6. The system of claim 1 wherein said first interface type is a PS/2 interface and said second interface type is a serial interface, said first wire carrying said electrical power at a first voltage level when the computer input device is coupled to the PS/2 interface and carrying said electrical power at a second voltage level higher than said first voltage level when the computer input device is coupled to the serial interface, said second wire carrying said first signal at said first voltage level when the cursor controller is coupled to the PS/2 interface and carrying said additional electrical power at said second voltage level higher than said first voltage level when the computer input device is coupled to the serial interface, said voltage clamp being activated by said second voltage to couple said additional electrical power to said first wire when the computer input device is coupled to the serial interface and remaining inactive to block said first signal when the computer input is coupled to the PS/2 interface.

7. The system of claim 6, further including a clock generator generating a clock signal on said second wire as said first signal when the computer input is coupled to the PS/2 interface and carrying said additional power to the computer input device when connected to the serial interface.

8. The system of claim 1 wherein said voltage clamp is coupled to a power supply node and is coupled to said first wire at a power input terminal, the system further including a current limiting device coupled between said power input terminal and said power supply node to limit a flow of electrical current thereto.

9. The system of claim 8 wherein said current limiting device is a transistor.

10. The system of claim 1 for use with data displayed on a display device, the system further including:

a first encoder circuit to generate a first set of electrical signals corresponding to user manipulation of the computer input device to move the cursor in a first direction on the display device;

a second encoder circuit to generate a second set of electrical signals corresponding to user manipulation of the computer input device to move the cursor in a second direction on the display device orthogonal to said first direction on the display device; and a third encoder circuit to generate a third set of electrical signals corresponding to user manipulation of the computer input device to alter the display of data displayed on the display device with said additional electrical power providing electrical power for at least a portion of one of said first, second, and third encoder circuits.

11. A system for the shared use of lines in a computer input device alternatively coupled to an interface having a first or second interface type in a computer by a wire cable, the wire cable containing a power wire to provide electrical power to the computer input device when coupled to the first interface type and the second interface type, the system comprising:

a first wire in the wire cable to carry a first signal having a first signal type if the computer input device is coupled to the first interface type and to carry a second signal having a second signal type if the computer input device is coupled to the second interface, the first signal type being compatible for operation with the first interface type and the second signal type being compatible for operation with the second interface type;

a second wire in the wire cable to provide a reference voltage; and a voltage clamp coupled between said first wire and said second wire to thereby limit a voltage of said first signal.

12. The system of claim 11 for use with data displayed on a display device wherein said second signal is additional electrical power to the computer input device when coupled to the second interface type, the system further including:

a first encoder circuit to generate a first set of electrical signals corresponding to user manipulation of the computer input device to move the cursor in a first direction on the display device;

a second encoder circuit to generate a second set of electrical signals corresponding to user manipulation of the computer input device to move the cursor in a second direction on the display device orthogonal to said first direction on the display device; and a third encoder circuit to generate a third set of electrical signals corresponding to user manipulation of the computer input device to alter the display of data displayed on the display device with said additional electrical power providing electrical power for at least a portion of one of said first, second, and third encoder circuits.

13. The system of claim 12 wherein the computer input device is a mouse having a rotatable encoder ball that rotates in response to user movement of the mouse and said first and second encoder circuits encode said ball rotation in two orthogonal directions.

14. A system to provide electrical power to a three dimensional computer input device through a wire cable alternatively couplable to an interface having one of a first interface type or a second interface type, the system comprising:

a first wire in the wire cable to carry electrical power to the computer input device;

a second wire in the wire cable to carry a first signal if the computer input device is coupled to the first interface type and to carry additional electrical power to the computer input device if the computer input device is coupled to the second interface type;

a voltage clamp coupled between said first and second wires in the wire cable to permit said additional electrical power to be coupled to said first wire if the computer input device is coupled to the second interface type and to prevent said first signal from being coupled to said first wire if the computer input device is coupled to the first interface type;

first and second encoder circuits to generate a set of electrical signals corresponding to user manipulation of the computer input device to move the cursor in first and second orthogonal directions on the display device; and a third encoder circuit to generate a set of electrical signals corresponding to user manipulation of the computer input device in a manner independent of user manipulation associated with said first and second encoder circuits with said additional electrical power providing electrical power for at least a portion of one of said first, second, and third encoder circuits when coupled to the second interface type.

15. A method for the shared use of lines in a computer input device alternatively coupled to an interface having a first or second interface type in a computer by a wire cable, the wire cable containing a power wire to provide electrical power to the computer input device when coupled to the first interface type and the second interface type, the method comprising the steps of:

coupling a first signal having a first signal type to a first wire in the wire cable if the computer input device is coupled to the first interface type and coupling a second signal having a first signal type to said first wire if the computer input device is coupled to the second interface type, the first signal type being compatible for operation with the first interface type and the second signal type being compatible for operation with the second interface type;

providing a reference voltage on a second wire in the wire cable; and limiting a voltage on said first wire to couple said first signal to said second wire if the computer input device is coupled to the first interface type and to block the second signal from the first wire when the computer input device is coupled to the second interface type.

16. The method of claim 15 for use with data displayed on a display device wherein said second signal is additional electrical power to the computer input device when coupled to the second interface type, the method further including the steps of:

generating a first set of electrical signals corresponding to user manipulation of the computer input device to move the cursor in a first direction on the display device;

generating a second set of electrical signals corresponding to user manipulation of the computer input device to move the cursor in a second direction on the display device orthogonal to said first direction on the display device; and generating a third set of electrical signals corresponding to user manipulation of the computer input device in a manner independent of user manipulation associated with said first and second sets of electrical signals with said additional electrical power providing electrical power when coupled to the second interface type.

* * * * *